US008797255B2

(12) United States Patent
Hsu et al.

(10) Patent No.: US 8,797,255 B2
(45) Date of Patent: Aug. 5, 2014

(54) ELECTRONIC-INK DISPLAY PANEL

(75) Inventors: Yu-Chen Hsu, Hsinchu (TW);
Chi-Ming Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 1111 days.

(21) Appl. No.: 11/951,150

(22) Filed: Dec. 5, 2007

(65) Prior Publication Data

US 2008/0273132 A1   Nov. 6, 2008

(30) Foreign Application Priority Data

May 1, 2007   (TW) ............................... 96115498 A

(51) Int. Cl.
*G09G 3/34*   (2006.01)

(52) U.S. Cl.
USPC ........................................... 345/107; 359/296

(58) Field of Classification Search
USPC ........................................... 345/107; 359/296
See application file for complete search history.

(56) References Cited

U.S. PATENT DOCUMENTS

| | | | |
|---|---|---|---|
| 5,923,310 A * | 7/1999 | Kim ................................. | 345/90 |
| 6,278,427 B1 | 8/2001 | Matsumoto et al. | |
| 6,504,524 B1 | 1/2003 | Gates et al. | |
| 2002/0167477 A1* | 11/2002 | Tsutsui et al. .................. | 345/89 |
| 2004/0239614 A1* | 12/2004 | Amundson et al. ........... | 345/107 |
| 2005/0200788 A1* | 9/2005 | Edwards ........................ | 349/139 |
| 2006/0250533 A1* | 11/2006 | Shih .............................. | 349/38 |
| 2006/0284811 A1* | 12/2006 | Huang ........................... | 345/92 |
| 2007/0091418 A1* | 4/2007 | Danner et al. ................ | 359/296 |
| 2007/0126941 A1* | 6/2007 | Cheng ........................... | 349/38 |
| 2007/0222800 A1* | 9/2007 | Fish et al. ..................... | 345/694 |
| 2007/0279566 A1* | 12/2007 | Huang ........................... | 349/143 |

FOREIGN PATENT DOCUMENTS

| | | |
|---|---|---|
| JP | 2002-328386 | 11/2002 |
| JP | 2003-535355 | 11/2003 |
| JP | 2004-309848 | 11/2004 |
| JP | 2005-099797 | 4/2005 |
| JP | 2006-227053 | 8/2006 |
| JP | 2007-139984 | 6/2007 |
| JP | 2007-523375 | 8/2007 |
| JP | 2007-240806 | 9/2007 |
| TW | 200641497 | 12/2005 |
| WO | WO01/07961 | 2/2001 |
| WO | 03079324 | 9/2003 |
| WO | WO2005/083667 | 9/2005 |

* cited by examiner

*Primary Examiner* — Jonathan Boyd
(74) *Attorney, Agent, or Firm* — CKC & Partners Co., Ltd.

(57) ABSTRACT

An electronic-ink display panel including an active matrix substrate, a front plane laminate and an electronic-ink layer is provided. The active matrix substrate has multiple pixel units. Each pixel unit includes multiple sub-pixel units, and each sub-pixel unit has a storage capacitor. In the same pixel unit, the capacitance of the storage capacitor of at least one sub-pixel unit is different from those of the storage capacitors of the other sub-pixel units. The front plane laminate is disposed above the active matrix substrate and the electronic-ink layer is disposed between the active matrix substrate and the front plane laminate.

14 Claims, 24 Drawing Sheets

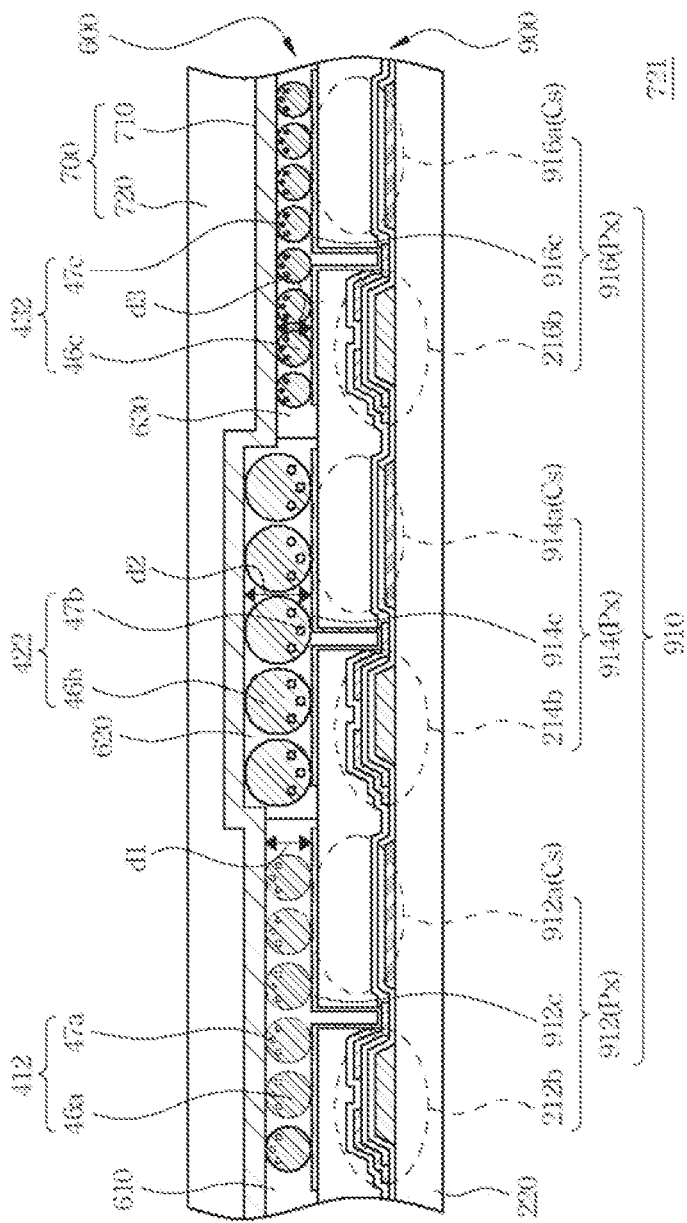

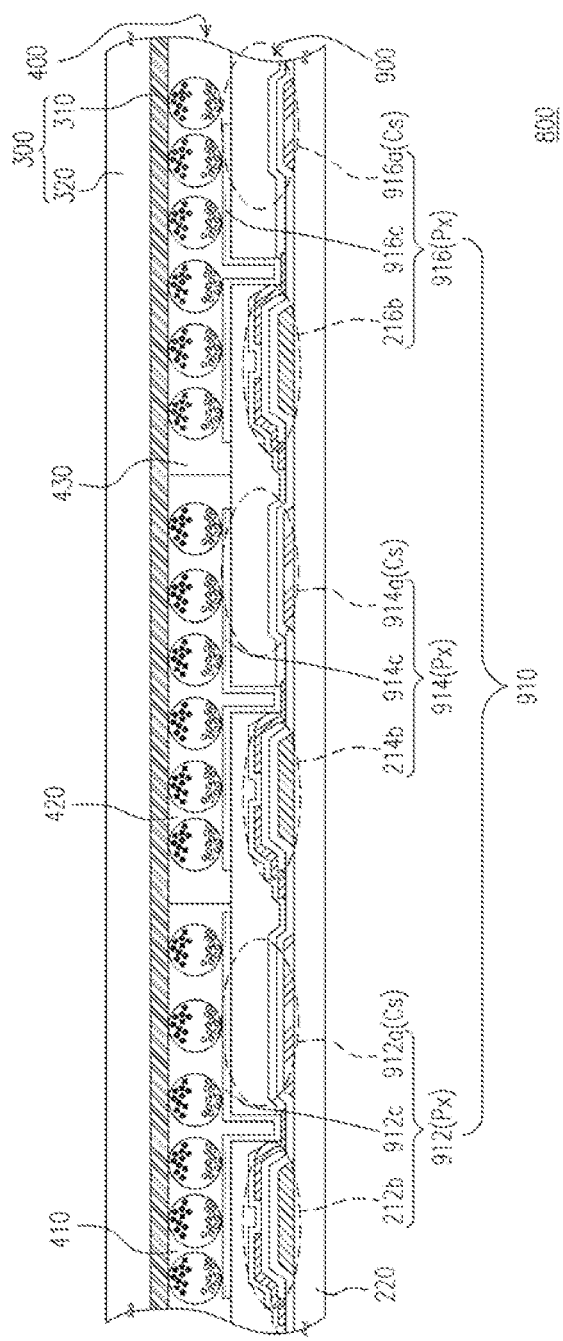

ELECTRONIC-INK DISPLAY PANEL

RELATED APPLICATIONS

This application claims priority to Taiwan Application Serial Number 96115498, filed May 1, 2007, which is herein incorporated by reference.

FIELD OF THE INVENTION

The present invention relates to a display panel, and more specifically to an electronic-ink display panel.

BACKGROUND OF THE INVENTION

In general, a currently popular electronic-ink display panel comprises: a front plane laminate (FPL), an electronic-ink layer and a thin film transistor (TFT) array substrate, wherein the front plane laminate has a transparent electrode, and the electronic-ink layer has display material which is operated by charged particles and has bi-stable states.

Using a conventional electronic-ink layer as an example, the charged particles includes positively charged particles and negatively charged particles contained in respective microcapsules with a transparent fluid, wherein the color of the positively charged particles and that of the negatively charged particles are different, such as black and white. When the electric fields between the pixel electrodes and the transparent electrode on the TFT array substrate are varied, the positively charged particles and negatively charged particles of different colors will be moved upwards or downwards in accordance with the direction of the electric fields, thereby enabling the respective microcapsules to show white or black color. Further, each of the microcapsules may contain single-polarity charged particles and an opaque fluid, wherein the color of the single-polarity charged particles and that of the opaque fluid are different, such as black and white. When the electric fields between the pixel electrodes and the transparent electrode are varied, the single-polarity charged particles will be moved upwards or downwards in accordance with the direction of the electric fields, thereby enabling the microcapsules to show white or black color.

Using another conventional electronic-ink layer as an example, each of the charged particles is a bi-color charged particle, which shows two different colors on its respective surfaces. The surfaces of the bi-color charged particle own different polarities of charges in accordance with their colors. When the electric fields between each of the pixel electrodes and the transparent electrode on the TFT array substrate are varied, the bi-color charged particles will roll in accordance with the direction of the electric fields, thereby enabling the respective charged particles to show white or black color.

FIG. 1A is a schematic diagram showing the structure of a conventional electronic-ink display panel. FIG. 1B is a schematic top view showing a TFT array substrate of the electronic-ink display panel illustrated in FIG. 1A, wherein FIG. 1A is a cross-sectional view showing the thin film transistor array substrate of the electronic-ink display panel viewed along the A-A' line in FIG. 1B. Referring to FIG. 1A and FIG. 1B simultaneously, an electronic-ink display panel 10 comprises a TFT array substrate 20, a front plane laminate 30, and an electronic-ink layer 40, wherein the front plane laminate 30 is disposed above the TFT array substrate 20. The electronic-ink layer 40 is disposed between the front plane laminate 30 and the TFT array substrate 20.

The TFT array substrate 20 comprises a substrate 21, a plurality of scan lines 22, and a plurality of sub-pixel units 24, wherein the scan lines 22 and data lines 23 are disposed on the substrate 21 to define a plurality of pixel areas 21a thereon. The sub-pixel units 24 are respectively disposed in the pixel areas 21a on the substrate 21, and each of the sub-pixel units 24 has a storage capacitor 24a. In addition, each of the sub-pixel units 24 has a thin film transistor 24b and a pixel electrode 24c. The thin film transistor 24b is electrically connected to one of the scan lines 22 and one of the data lines 23. The pixel electrode 24c is electrically connected to the thin film transistor 24b. The front plane laminate 30 comprises a protection film 32 and a transparent electrode layer 34, wherein the protection film 32 is disposed on the transparent electrode 34.

In accordance with the above description, the pixel electrode 24c can be charged or discharged by applying proper voltage signals to the scan lines 22, data lines 23 and the transparent electrode 34. Thus, the charged particles contained in the microcapsule 41 in the electronic-ink layer 40 are driven for enabling the electronic-ink display panel 10 to display images. However, the aforementioned electronic-ink display panel 10 can merely show a black-and-white display, and thus the applications of the electronic-ink display panel 10 are limited.

FIG. 1C is a schematic diagram showing the structure of another conventional electronic-ink display panel 42. The electronic-ink display panel 42 is similar to the electronic-ink display panel 10 shown in FIG. 1A, but is different in that the electronic-ink layer 40 of the electronic-ink display panel 42 uses bi-color charged particles 44 to replace the microcapsules 41 shown in FIG. 1A.

FIG. 1D is a schematic diagram showing the structure of further another conventional electronic-ink display panel 45. The electronic-ink display panel 45 is similar to the electronic-ink display panel 10 shown in FIG. 1A, but is different in that the microcapsule 41 in the electronic-ink layer 40 of the electronic-ink display panel 45 comprises an opaque fluid 46 (for example in white color) and single-polarity charged particles 47 (for example in black color). The single-polarity charged particles 47 move upwards or downwards in accordance with the direction of the electric field applied thereto. If the single-polarity charged particles 47 move upwards, the electronic-ink display panel 45 shows black color. If the single electricity particles move downwards, the electronic-ink display panel 45 shows white color.

SUMMARY OF THE INVENTION

In view of the above-mentioned description, an aspect of the present invention is to provide an electronic-ink display panel, which can display colored images, wherein the electronic-ink display panel has a plurality of sub-pixel units, and the total capacitance of each of the sub-pixel units (the sum of a storage capacitor and a display capacitor) is the same.

In accordance with the above aspect or others, the present invention provides an electronic-ink display panel. The electronic display panel comprises: an active matrix substrate, a front plane laminate, and an electronic-ink layer. The active matrix substrate has a plurality of pixel units, wherein each of the pixel units comprises a plurality of sub-pixel units, and in the same pixel unit, the capacitance of the storage capacitor of at least one of the sub-pixel units is different from those of the storage capacitors of the other sub-pixel units. The front plane laminate is disposed over the active matrix substrate. The electronic-ink layer disposed between the active matrix substrate and the front plane laminate.

In accordance with an electronic-ink display panel of an embodiment of the present invention, the active matrix substrate further comprises: a substrate, a plurality of scan lines, and a plurality of data lines. The scan lines and the data lines are disposed on the substrate, wherein the data lines and the scan lines define a plurality of pixel areas on the substrate.

In accordance with an electronic-ink display panel of a anther embodiment of the present invention, each of the pixel units comprises a first sub-pixel unit, a second sub-pixel unit, and a third sub-pixel unit. The first sub-pixel unit has a first storage capacitor. The second sub-pixel unit has a second storage capacitor. The third sub-pixel unit has a third storage capacitor. The first sub-pixel unit, the second sub-pixel unit, and the third sub-pixel unit of each of the pixel units are electrically connected to the same scan line and separately located in three pixel areas, every two of which are adjacent to each other.

In accordance with an electronic-ink display panel of a further embodiment of the present invention, the front plane laminate comprises a common electrode and a protection film. The common electrode is disposed on the electronic-ink. The protection film disposed on the common electrode.

In accordance with an electronic-ink display panel of a further embodiment of the present invention, each of the first sub-pixel units has a first active element and a first pixel electrode electrically connected to the first active element, and each of the second sub-pixel units has a second active element and a second pixel electrode electrically connected to the second active element, and each of the third sub-pixel units has a third active element and a third pixel electrode electrically connected to the third active element.

In accordance with an electronic-ink display panel of a further embodiment of the present invention, the electronic-ink layer comprises a plurality of first ink material patterns, a plurality of second ink material patterns, and a plurality of third ink material patterns. The first ink material patterns are disposed on the first pixel electrodes. The second ink material patterns are disposed on the second pixel electrodes. The third ink material patterns are disposed on the third pixel electrodes.

In accordance with an electronic-ink display panel of a further embodiment of the present invention, the relationships among the capacitance $C1$ of the first storage capacitor, the capacitance $C2$ of the second storage capacitor and the capacitance $C3$ of the third storage capacitor are $C1 \neq C2 \neq C3$.

In accordance with an electronic-ink display panel of a further embodiment of the present invention, the common electrode, one of the first ink material patterns, and the first pixel electrode corresponding thereto construct a first capacitor, and the common electrode, one of the second ink material patterns, and the second pixel electrode corresponding thereto construct a second capacitor, and the common electrode, one of the third ink material patterns, and the third pixel electrode corresponding thereto construct a third capacitor, wherein the relationships among the capacitance $Ce1$ of the first capacitor, the capacitance $Ce2$ of the storage capacitor and the capacitance $Ce3$ of the third capacitor are $Ce1 \neq Ce2 \neq Ce3$, and $C1+Ce1=C2+Ce2=C3+Ce3$.

In accordance with an electronic-ink display panel of a further embodiment of the present invention, the relationships among the area $A1$ occupied by the first storage capacitor, the area $A2$ occupied by the second storage capacitor, and the area $A3$ occupied by the third storage capacitor is $A1 \neq A2 \neq A3$.

In accordance with an electronic-ink display panel of a further embodiment of the present invention, the relationships among the thickness (d1) of each of the first ink material patterns, the thickness (d2) of each of the second ink material patterns, and the thickness (d3) of each of the third ink material patterns are $d1 \neq d2 \neq d3$.

In accordance with an electronic-ink display panel of a further embodiment of the present invention, the material of the first ink material patterns, the material of the second material patterns, and the material of the third material patterns are different.

In accordance with an electronic-ink display panel of a further embodiment of the present invention, the relationships among the overlap area $B1$ between the common electrode and each of the first pixel electrodes, the overlap area $B2$ between the common electrode and each of the second pixel electrodes, and the overlap area $B3$ between the common electrode and each of the third pixel electrodes are $B1 \neq B2 \neq B3$.

In accordance with an electronic-ink display panel of a further embodiment of the present invention, the relationship among the capacitance $C1$ of each of the first storage capacitors, and the capacitance $C2$ of each of the second storage capacitor, and the capacitance $C3$ of each of the third storage capacitor are $C1 \neq C2$, and $C2 \neq C3$.

In accordance with an electronic-ink display panel of a further embodiment of the present invention, the common electrode, one of the first ink material patterns, and the first pixel electrode corresponding thereto construct a first capacitor, and the common electrode, one of the second ink material patterns, and the second pixel electrode corresponding thereto construct a second capacitor, and the common electrode, one of the third ink material patterns, and the third pixel electrode corresponding thereto construct a third capacitor, wherein the relationships among the capacitance $Ce1$ of the first capacitor, the capacitance $Ce2$ of the storage capacitor and the capacitance $Ce3$ of the third capacitor are $Ce1 \neq Ce2$, and $Ce2 = Ce3$.

In accordance with an electronic-ink display panel of a further embodiment of the present invention, the relationships among the area $A1$ occupied by the first storage capacitor, the area $A2$ occupied by the second storage capacitor, and the area $A3$ occupied by the third storage capacitor are $A1 \neq A2$ and $A2 = A3$.

In accordance with an electronic-ink display panel of a further embodiment of the present invention, the relationships among the thickness $d2$ of each of the first ink material patterns, the thickness $d2$ of each of the second ink material patterns, and the thickness $d3$ of each of the third ink material patterns are $d1 \neq d2$, $d2 \neq d3$.

In accordance with an electronic-ink display panel of a further embodiment of the present invention, the material of the first ink material patterns are different from the material of the second material patterns, and the material of the second material patterns is the same as the material of the third material patterns.

In accordance with an electronic-ink display panel of a further embodiment of the present invention, the relationships among the overlap area $B1$ between the common electrode and each of the first pixel electrodes, the overlap area $B2$ between the common electrode and each of the second pixel electrodes, and the overlap area $B3$ between the common electrode and each of the third pixel electrodes are $B1 \neq B2$, and $B2 = B3$.

In the electronic-ink display panel provided by the present invention, the capacitance of the storage capacitor compensates the capacitance of the display capacitor constituted by the common electrode, one of the ink material patterns, and the pixel electrode corresponding to the one of the ink material patterns, to make each of the total capacitances of the storage capacitor and the display storage capacitor to be the same with each other.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4E is a schematic diagram showing the structure diagram of further another electric ink display panel in accordance with the second embodiment of the present invention;

FIG. 5A is a schematic diagram showing the structure of an electronic-ink display panel in accordance with a third embodiment of the present invention;

DETAILED DESCRIPTION OF THE PREFERRED EMBODIMENT

For displaying colored picture, an electronic-ink display panel is provided, so as to overcome the shortcomings of the prior art that can only show a black-and-white display. Further, even though the electronic-ink display panel is able to show a colored display, some issues have to be addressed.

Figure 1A:
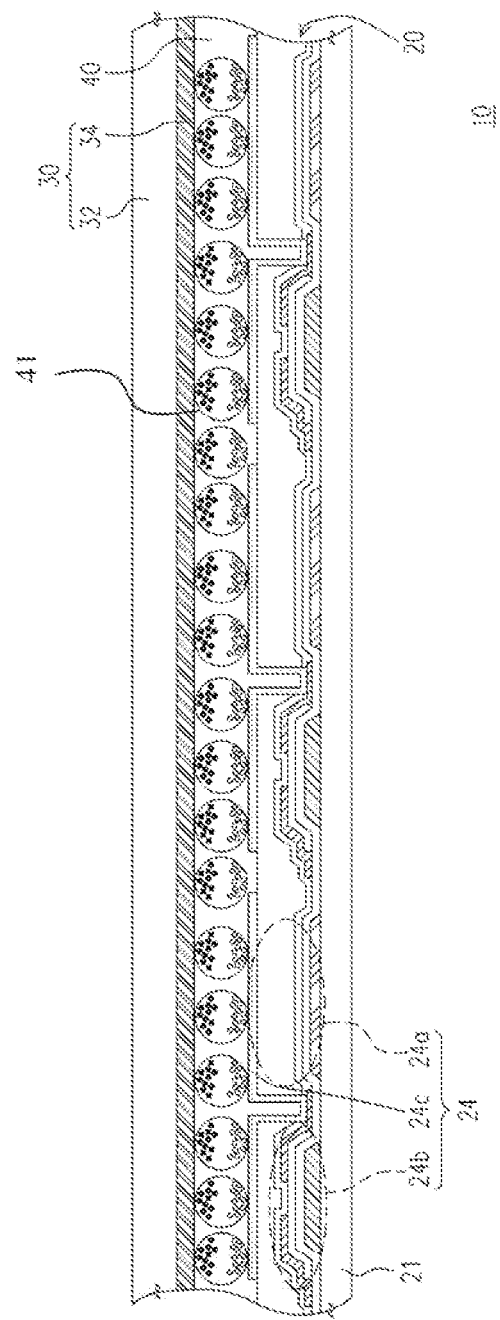
FIG. 1A is a schematic diagram showing the structure of a conventional electronic-ink display panel.
Figure 1B:
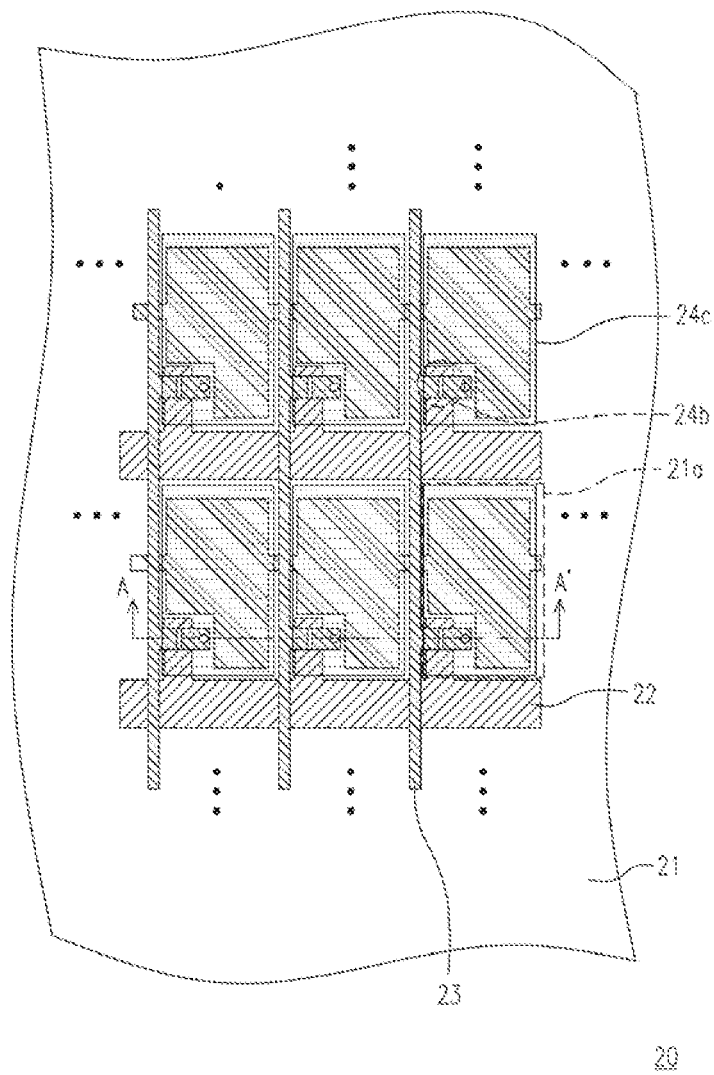
FIG. 1B is a schematic top view showing a TFT array substrate of the electronic-ink display panel illustrated in FIG. 1A.
Figure 1C:
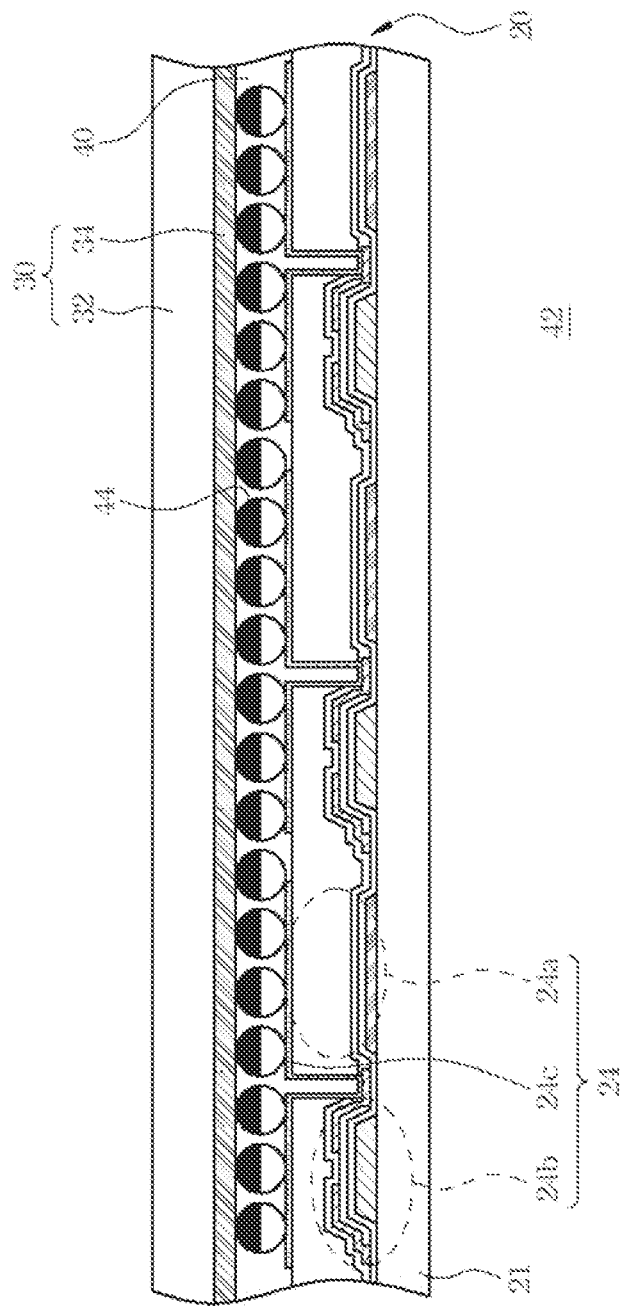
FIG. 1C is a schematic diagram showing the structure of another conventional electronic-ink display panel.
Figure 1D:
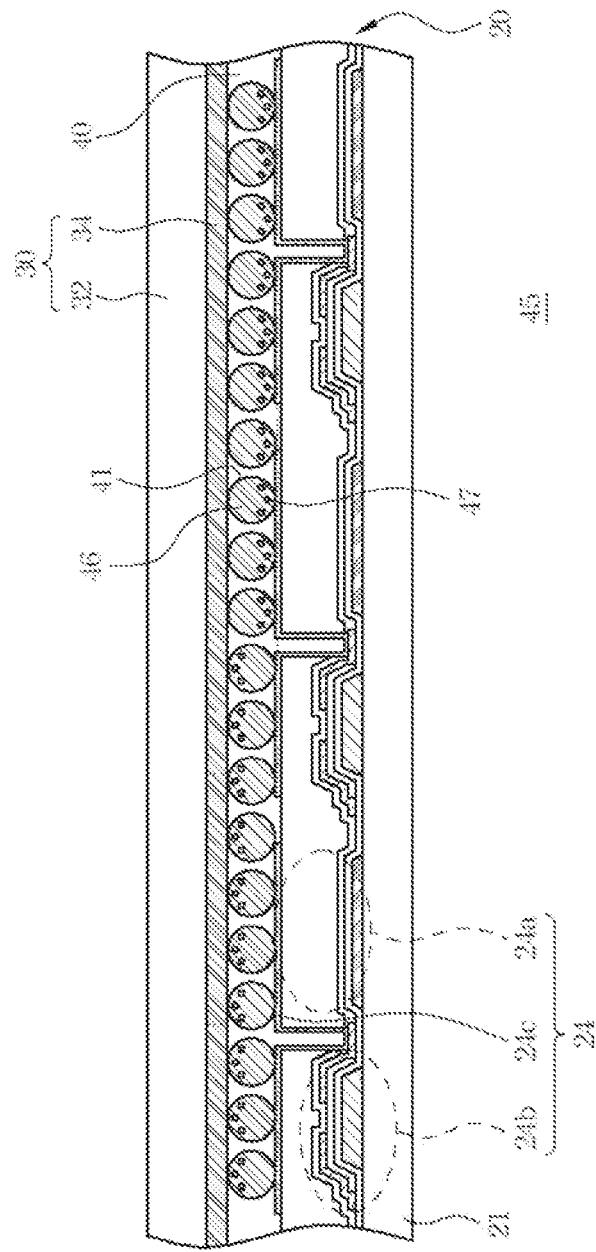
FIG. 1D is a schematic diagram showing the structure of further another conventional electronic-ink display panel.
Figure 2A:
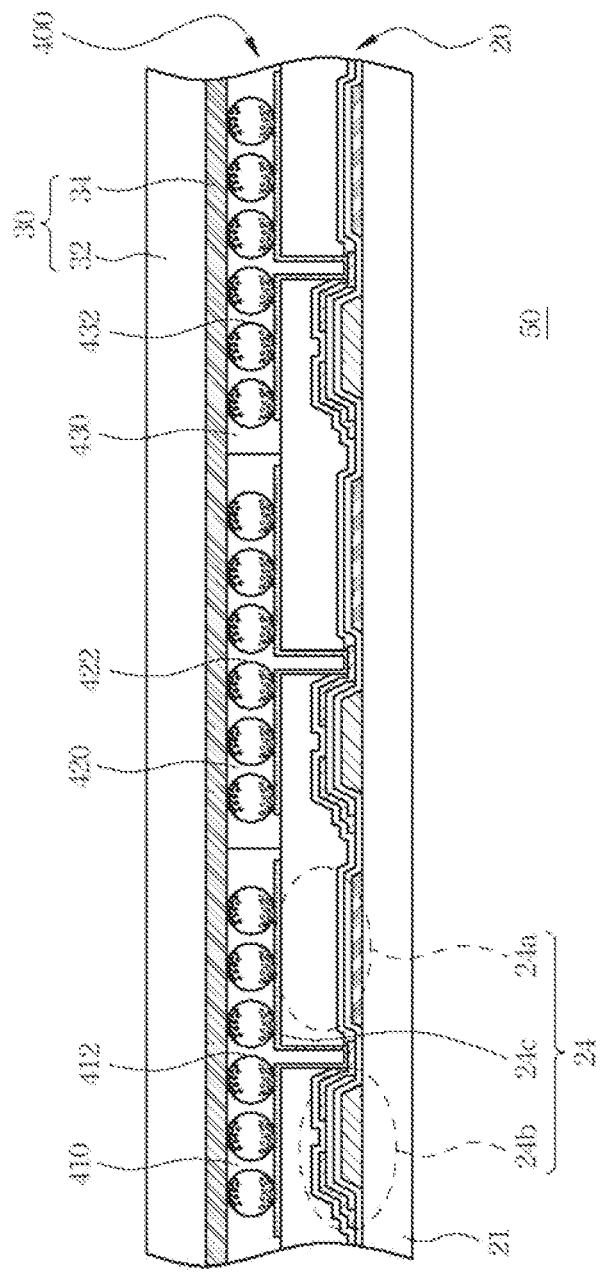
FIG. 2A is a schematic diagram showing the structure of the aforementioned electronic-ink display panel of the present invention.
Figure 2B:
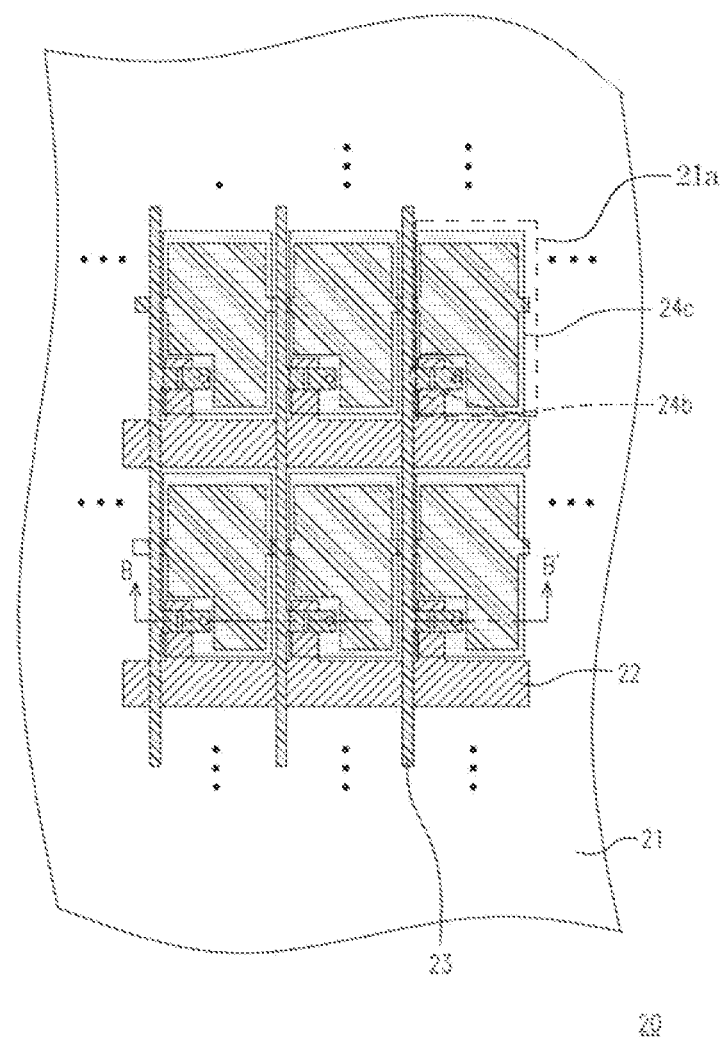
FIG. 2B is a schematic top view showing a TFT array substrate of the electronic-ink display panel illustrated in FIG. 2A.

FIG. 2A is a schematic diagram showing the structure of the aforementioned electronic-ink display panel of the present invention. FIG. 2B is a schematic top view showing a TFT array substrate of the electronic-ink display panel illustrated in FIG. 2A, wherein the FIG. 2A is a cross-sectional view showing the thin film transistor array substrate of the electronic-ink display panel viewed along the line B-B' in the FIG. 2B. Referring to FIG. 2A and FIG. 2B simultaneously, the electronic-ink display panel 50 comprises a TFT array substrate 20, a front plane laminate 30, and an electronic-ink layer 400, wherein the front plane laminate 30 is disposed above the TFT array substrate 20. The electronic-ink layer 400 is disposed between the front plane laminate 30 and the TFT array substrate 20.

The TFT array substrate 20 comprises: a substrate 21, a plurality of scan lines 22, a plurality of data lines 23 and a plurality of sub-pixel units 24, wherein the scan lines 22 and the data lines 23 are disposed on the substrate 221 to define a plurality of pixel areas 21a thereon. The sub-pixel units 24 are respectively disposed in the pixel areas 21a on the substrate 21, and each of the sub-pixel units 24 has a storage capacitor 24a. In addition, each of the sub-pixel units 24 has a thin film transistor 24b and a pixel electrode 24c. The thin film transistor 24b is electrically connected to one of the scan lines 22 and one of the data lines 23. The pixel electrode 24c is electrically connected to the thin film transistor 24b. The front plane laminate 30 comprises a protection film 32 and a transparent electrode layer 34. The transparent electrode layer 34 is disposed below the protection film 32.

The electronic-ink layer 400 comprises a plurality of first ink material patterns 410, a plurality of second ink material patterns 410, and a plurality of third ink material patterns 410. The first ink material patterns 410, the second ink material patterns 410, and the third ink material patterns 410 are disposed on the pixel area 21a of the substrate 21. Thus, the first ink material patterns 410, the second ink material patterns 420, and the third ink material patterns 430 are respectively disposed on the three pixel units 24 which are adjacent to each other and are connected to the same one of the scan lines 22.

In the electronic-ink display panel 50, the microcapsules in the first ink material patterns 410, the second ink material patterns 420, and the third ink material patterns 430 contain charged dyes of different colors. For example, each of the microcapsules 412 in the first ink material patterns 410 contains charged dyes of red and other colors, and each of the microcapsules 422 in the second ink material patterns 420 contains charged dyes of green and other colors, and each of the microcapsules 432 microcapsules in the third ink material patterns 430 contains charged dyes of blue and other colors.

In view of the above description, the charged dyes in the first ink material patterns 410, those in the second ink material patterns 420, and those in the third ink material patterns 430 can be driven by applying proper voltage signals to the scan lines 22, data lines 23, and the transparent electrode layer 34, so as to enable the electronic-ink display panel 50 to display colored images.

Figure 2C:
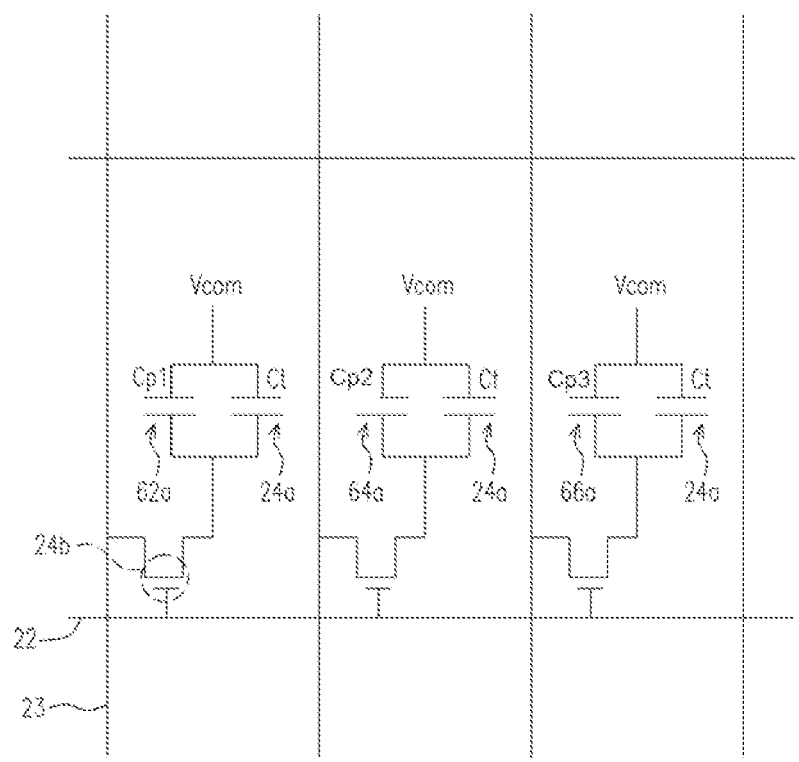
FIG. 2C is a schematic diagram showing a partial equivalent circuit of the electronic display panel in the FIG. 2A.

FIG. 2C is a schematic diagram showing a partial equivalent circuit of the electronic display panel in the FIG. 2A. Referring to FIG. 2A and FIG. 2C simultaneously, the transparent electrode layer 34、the first ink material patterns 410, and the pixel electrode 24c construct a first display capacitor 62a having a capacitance Cp1. The transparent electrode layer 34、the second ink material patterns 420, and the pixel electrode 24c construct a second display capacitor 64a having a capacitance Cp2. The transparent electrode layer 34、the third ink material patterns 430, and the pixel electrode 24c construct a third display capacitor 66a, having a capacitance Cp3. In addition, the first ink material pattern 410, the second ink material pattern 420, and the third ink material pattern 430 which respectively comprise charged dyes of different colors generally have different dielectric constants. Hence the capacitances Cp1、Cp2 and Cp3 are different to one another.

However, each of the sub-pixel units 24a has the same capacitance Ct of the storage capacitor 24a. Thus, the total capacitance (Ct+Cp1) of the storage capacitor 24a and the first display capacitor 62a, the total capacitance (Ct+Cp2) of the storage capacitor 24a and the second display capacitor 64a, and the total capacitance (Ct+Cp3) of the storage capacitor 24a and the third display capacitor 66a are all different, meaning Ct+Cp1≠Ct+Cp2≠Ct+Cp3.

Figure 2D:
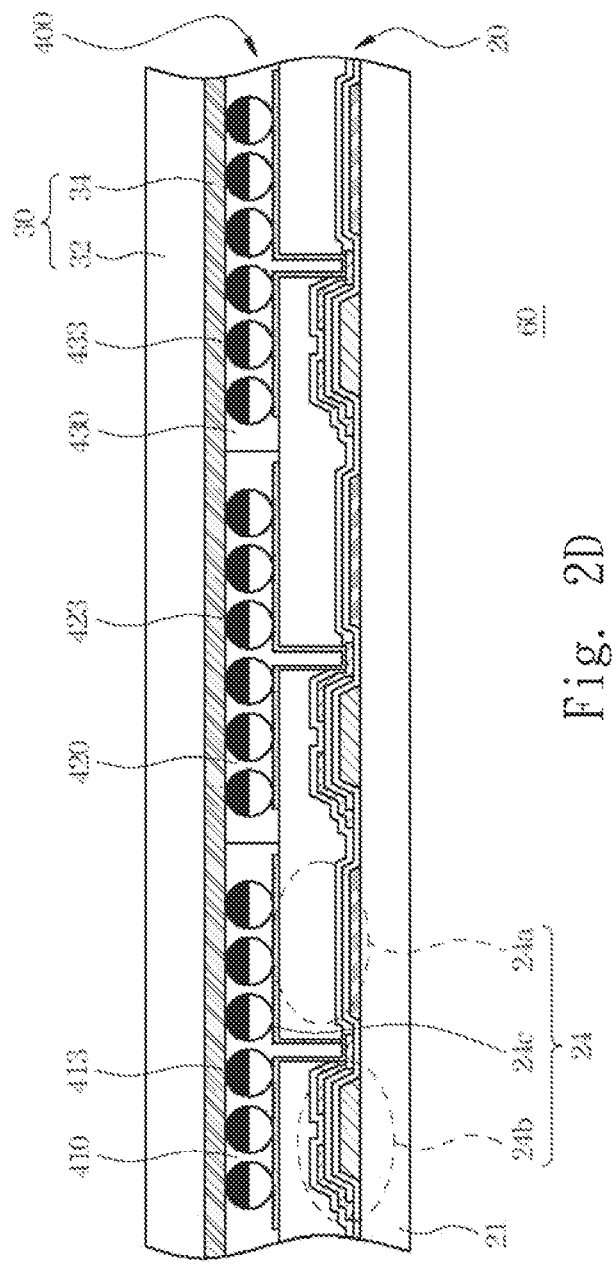
FIG. 2D is a schematic diagram showing the structure of another electronic-ink display panel of the present invention.

FIG. 2D is a schematic diagram showing the structure of another electronic-ink display panel 60 of the present invention. The electronic-ink display panel 60 is similar to the electronic-ink display panel 50, but is different in that the electronic-ink layer 400 comprises bi-color charged particles 413, 423, and 433 instead of the microcapsules 412, 422, and 432 used in the electronic-ink display panel 50.

Figure 2E:
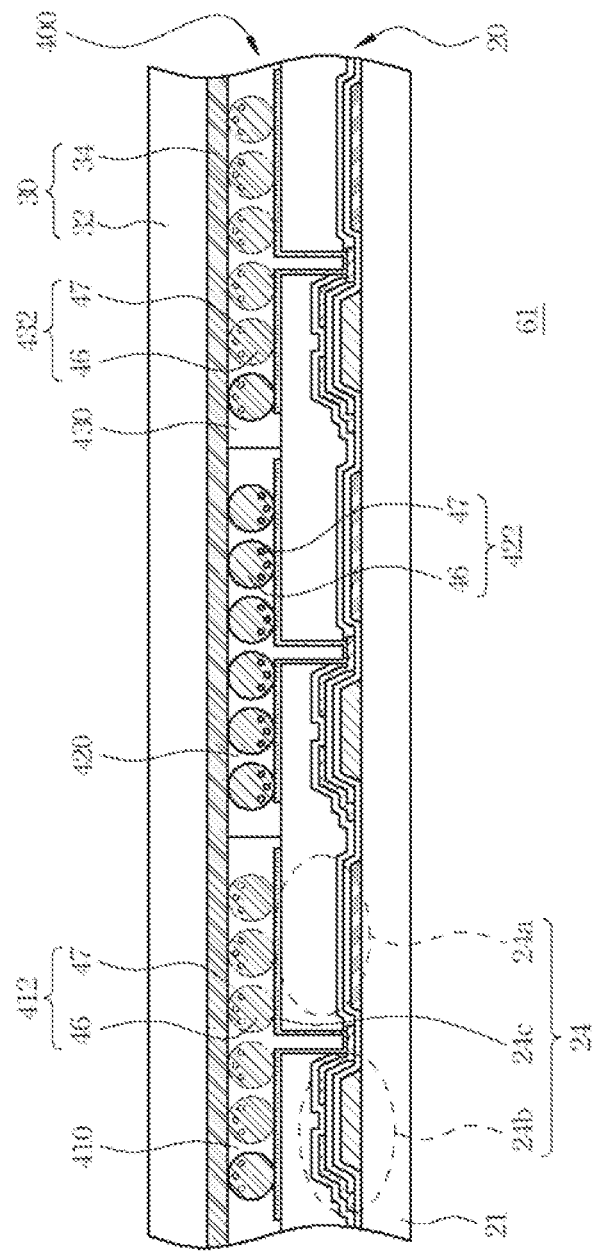
FIG. 2E is a schematic diagram showing the structure of further another electronic-ink display panel of the present invention.

FIG. 2E is a schematic diagram showing the structure of further another electronic-ink display panel 61 of the present invention. The electronic-ink display panel 61 is similar to the electronic-ink display panel 50, but is different in that each of the microcapsules 412, 422, and 432 in the electronic-ink display panel 61 comprises the opaque fluid 46 and the charged particles 47.

It can be known from the above that the electronic-ink display panels 50 and 60 have the electronic-ink layer 400 comprising charged dyes of different colors, and still use the conventional TFT array substrate 20 and the conventional front plane laminate 30. The electronic-ink display panel 50 is able to show color images, but resulting in an issue of different total capacitances of the respective sub-pixel units.

To solve the aforementioned issue, the present invention provides an electronic display panel. Hereinafter, various embodiments are described in detail.

First Embodiment

Figure 3A:
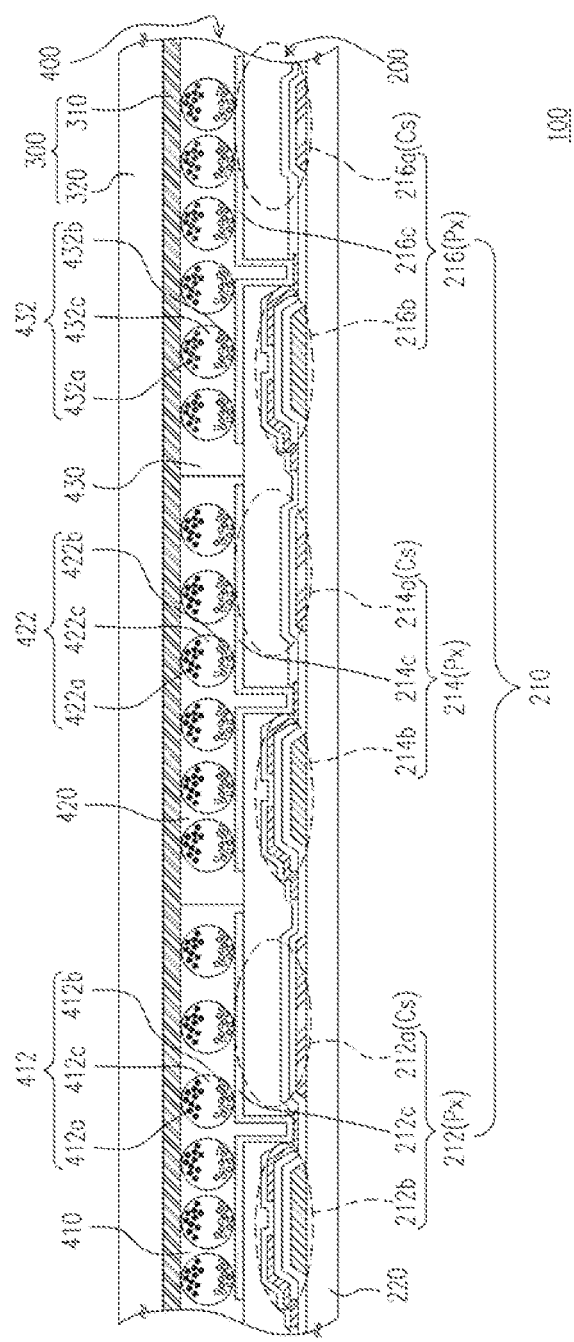
FIG. 3A is a schematic diagram showing the structure of an electronic-ink display panel in accordance with a first embodiment of the present invention.
Figure 3B:
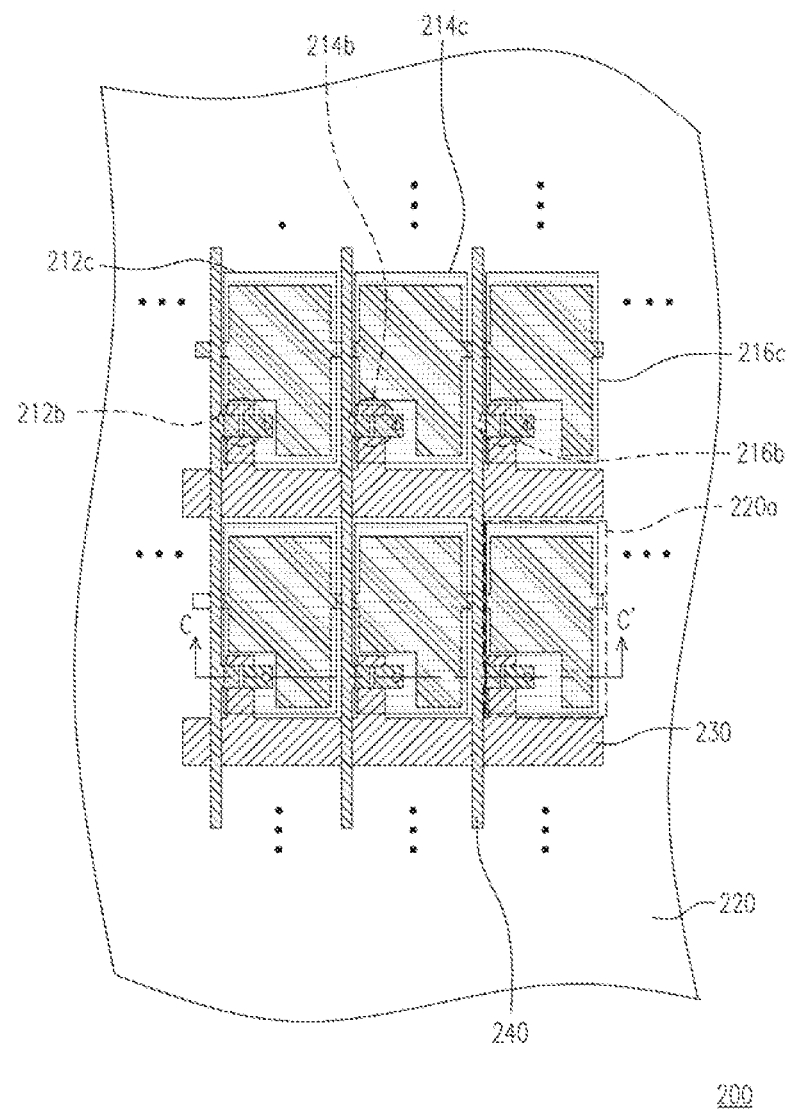
FIG. 3B is a schematic top view showing an active matrix substrate of the electronic-ink display panel illustrated in FIG. 3A.

FIG. 3A is a schematic diagram showing the structure of an electronic-ink display panel in accordance with a first embodiment of the present invention. FIG. 3B is a schematic top view showing an active matrix substrate of the electronic-ink display panel illustrated in FIG. 3A, wherein the FIG. 3A is a cross-sectional view showing the TFT array substrate in the electronic-ink display panel viewed along the line C-C' in the FIG. 3B. Referring to the FIG. 3A and FIG. 3B simultaneously, the electronic-ink display panel 100 comprises an active matrix substrate 200, a front plane laminate 300, and an electronic-ink layer 400. The active matrix substrate 200 has a plurality of pixel units 210, and each of the pixel units comprises a plurality of sub-pixels Px, and each of the pixel units 210 comprises a storage capacitor Cs. In each of the pixel units 210, the capacitance of the capacitor Cs of at least one of the sub-pixel units Px is different from the capacitances of the capacitors of the other sub-pixel units Px. The front plane laminate 300 is disposed above the active matrix substrate 200. The electronic-ink layer 400 is disposed between the active matrix substrate 200 and the front plane laminate 300. Hereinafter, the detail structures of the respective components are described.

In the present embodiment, the active matrix substrate 200 comprises a substrate 220, a plurality of scan lines 230, and a plurality of data lines 240. The scan lines 230 and the data lines 240 are disposed on the substrate 220, and define a plurality of pixel areas 220a.

In the active matrix substrate 200, each of the pixel units 210 comprises: a first sub-pixel unit 212, a second sub-pixel unit 214, and a third sub-pixel unit 216. In each of the pixel units 210, the first sub-pixel unit 212, the second sub-pixel unit 214, and the second sub-pixel unit 216 are electrically connected to the same scan line 230, and are respectively disposed in three pixel areas every two of which are adjacent to each other.

Detailedly speaking, the first sub-pixel unit 212 has a first storage capacitor 212a, a first active element 212b, and a first pixel electrode 212c. The second sub-pixel unit 214 has a second storage capacitor 214a, a second active element 214b, and a second pixel electrode 214c. The third sub-pixel unit 216 has a third storage capacitor 216a, a third active element 216b, and a third pixel electrode 216c. The first active element 212b, the second active element 214b, and the third active element 216c are respectively connected to one of the scan lines 230 and one of the data lines 240. The first pixel electrode 212c, the second pixel electrode 214c, and the third pixel electrode 216c are electrically connected respectively to the first active element 212b corresponding to the first pixel electrode 212c, the second active element 214b corresponding to the second pixel electrode 214c, and the third active element 216b corresponding to the third pixel electrode 216c.

The front plane laminate 300 comprises a common electrode 310 and a protection film 320. The common electrode 310 is disposed on the electronic-ink layer 400. The protection film 320 is disposed on the common electrode 310.

The electronic-ink layer 400 comprises a plurality of first ink material patterns 410, a plurality of second ink material patterns 420, and a plurality of third ink material patterns 430. One first ink material pattern 410 is disposed on the first pixel electrode 212c. One second ink material pattern 420 is disposed on the second pixel electrode 214c. One third ink material pattern 430 is disposed on the second pixel electrode 216c.

In view of the above, the substrate 220 can be, for example, a glass substrate, a quartz substrate, or a substrate made of other proper materials. The material of the scan lines 230 is, for example, aluminum, aluminum alloy, or other proper material with good electrical conductivity. The material of the data lines 240 is chromium, tungsten, or other proper material with good electrical conductivity. The first active element 212b, the second active element 214b, and the third active element 216c are, for example, thin film transistors, diodes, or other switch elements with three terminals. It is noted that, in the present invention, the first active element 212b, the second active element 214b, and the third active element 216c are illustrated as thin film transistors. The material of the first pixel electrode 212c, the second pixel electrode 214c, and the third pixel electrode 216c can be selected from the group consisted of indium tin oxide (ITO), indium zinc oxide (IZO), meta and the combination thereof, or other proper material. The material of the protection film 320 can be, for example, plastic, acrylics, or other proper materials.

The first ink material patterns 410 comprise, for example, a plurality of microcapsules 412, wherein each of the microcapsules 412 comprises a plurality of first particles 412a, a plurality of second particles 412b, and a transparent liquid 412c. The first particles 412a are, for example, red charged dye. The second particles 412b are, for example, the charged dye with the other color. The polarity of the first particles 412a is opposite to the polarity of the second particles 412b. The second ink material patterns 420 comprise, for example, a plurality of microcapsules 422, wherein each of the microcapsules 422 comprises a plurality of third particles 422a, a plurality of fourth particles 422b, and a transparent liquid 422c. The third particles 422a are, for example, green charged dye. The fourth particles 422b are, for example, the charged dye with the other color. The polarity of the third particles 422a is opposite to the polarity of the fourth particles 412b. The third ink material patterns 430 comprises, for example, a plurality of microcapsules 432, wherein each of the microcapsules 432 comprises a plurality of fifth particles 432a, a plurality of sixth particles 432b, and a transparent liquid 432c. The fifth particles 432a are, for example, blue charged dye. The sixth particles 432b are, for example, the charged dye with the other color. The polarity of the fifth particles 432a is opposite to the polarity of the sixth particles 432b.

Figure 3C:
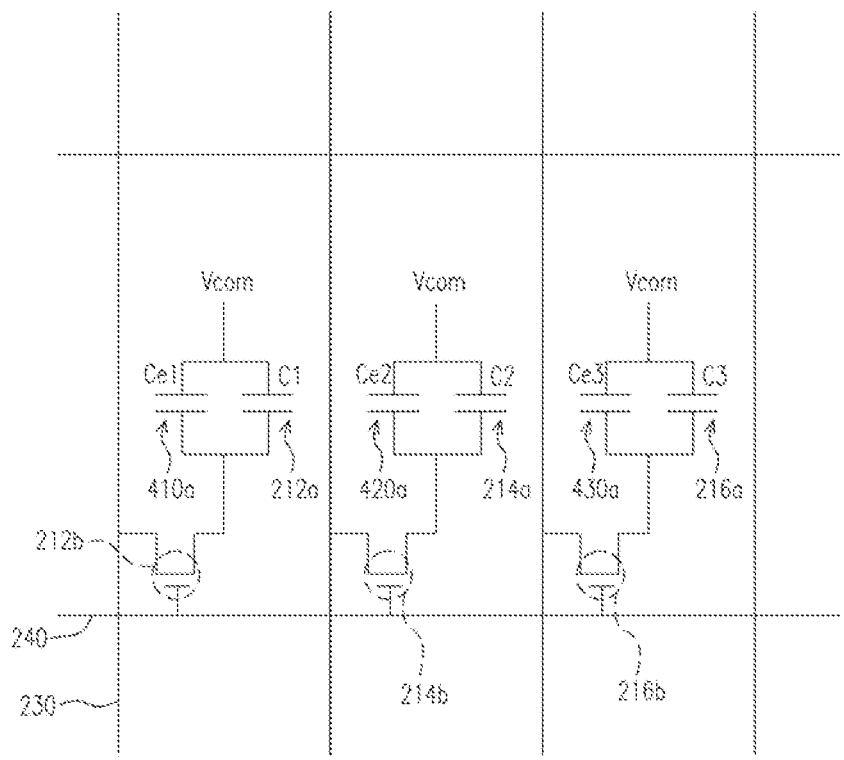
FIG. 3C is a schematic diagram showing a partial equivalent circuit of the electronic-ink display illustrated in the FIG. 3A.

FIG. 3C is a schematic diagram showing a partial equivalent circuit of the electronic-ink display illustrated in the FIG. 3A. Referring to FIG. 3A and FIG. 3C simultaneously, in the electronic-ink display panel 100, the common electrode 310, one of the first ink material patterns 410, and the first pixel electrode 212c corresponding to the one of the first ink material patterns 410 construct a first display capacitor 410 having a capacitance Ce1. The common electrode 310, one of the second ink material patterns 420, and the first pixel electrode 214c corresponding to the one of the first ink material patterns 420 construct a second display capacitor 420a, and the capacitance thereof is Ce2. The common electrode 310, one of the third ink material patterns 430, and the third pixel electrode 216c corresponding to the one of the third ink material patterns 430 construct a third display capacitor 430a having a capacitance Ce3.

In accordance with the present embodiment, the first ink material patterns 410, the second ink material patterns 420 and the third ink material patterns 430 are used to construct electronic-ink layer 400 thus that the electronic panel 100 is enable to display color images, wherein the colors of the first ink material patterns 410, the second ink material patterns 420 and the third ink material patterns 430 are different. Because of the difference between the color of the first ink material patterns 410, the color of the second ink material patterns 420, and the third ink material patterns 430, the dielectric constant of the first ink material patterns 410, the dielectric constant of the second ink material patterns 420, and the dielectric constant of the third ink material patterns 430 are different. Then the capacitance Ce1 of the first display capacitor 410a, the capacitance Ce2 of the second display capacitor 420a, and the capacitance Ce3 of the third display capacitor 430a are all different, meaning Ce1≠Ce2≠Ce3.

In addition, the first storage capacitor 212a has the capacitance C1, and the second storage capacitor 214a has the capacitance C2, and the third storage capacitor 216a has the capacitance C3. However, for letting C1+Ce1=C2+Ce2=C3+Ce3, the area occupied by the first storage capacitor 212a is designed to be A1, and the area occupied by the second storage capacitor 214a is designed to be A2, and the area occupied by the third storage capacitor 216a is designed to be A3, wherein the relationship between A1, A2, and A3 is A1≠A2≠A3. For letting C1≠C2≠C3, A1, A2, and A3 are designed to be all different thus that the total capacitance C1+Ce1, C2+Ce2, and C3+Ce3 are the same. Similarly, if the microcapsules in the first ink material patterns 410, the second ink material patterns 420, and the third ink material patterns 430 include charged dye with different color and an opaque liquid, the structure described above can make the total capacitance (C1+Ce1, C2+Ce2, and C3+Ce3) in the electronic display panel 100 are all the same.

It is noted that in the present invention, the first storage capacitor 212a, the second storage capacitor 214a, and the third storage capacitor 216a have different capacitance, but they are not limited to have all different capacitance. In an alternative embodiment, the first storage capacitor 212a, for example, has the capacitance different from the capacitance of the second storage capacitor 214a, and the third storage capacitor, for example, has the capacitance the same with the capacitance of the second storage capacitor 214a, meaning C1≠C2, and C2=C3.

Figure 3D:
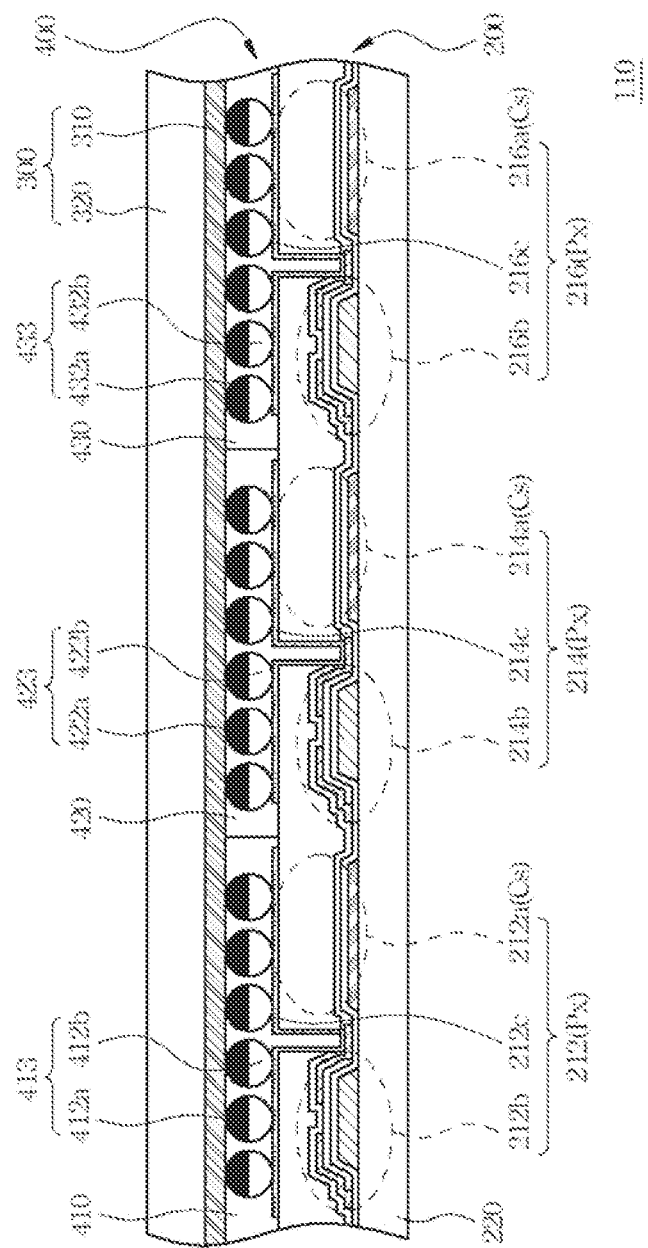
FIG. 3D is a schematic diagram showing the structure diagram of another electronic-ink display panel in accordance with the first embodiment of the present invention.

FIG. 3D is a schematic diagram showing the structure diagram of another electronic-ink display panel 110 in accordance with the first embodiment of the present invention. The electronic-ink display panel 110 is similar to the electronic-ink display panel 100, but the difference is in that the electronic-ink display panel 110 comprises bi-color charged particles 413, 423, and 433 instead of the microcapsules 412, 422 and 432 in the electronic-ink display panel 100. One first ink material pattern 410 comprises a plurality of bi-color charged particles 413, wherein one of the surfaces of the bi-color charged particles 413 has a plurality of first particles 412a, and another one has a plurality of second particles 412b. The first particles 412a are, for example, red charged dyes, and the second particles 412b are, for example, the charged dyes of other color, wherein the polarity of the first particles 412a is opposite to the polarity of the second particles 412b. One second ink material pattern 420 comprises a plurality of bi-color charged particles 423, wherein one of the surfaces of the bi-color charged particles 423 has a plurality of third particles 422a, and another one has a plurality of fourth particles 422b. The third particles 422a are, for example, green charged dyes, and the fourth particles 422b are, for example, the charged dyes of other color, wherein the polarity of the third particles 422a is opposite to the polarity of the fourth particles 422b. The third ink material pattern 430 comprises a plurality of bi-color charged particles 433, wherein one of the surfaces of the bi-color charged particles 433 has a plurality of fifth particles 432a, and another one of the surfaces of the bi-color charged particles 433 has a plurality of sixth particles 432b. The fifth particles 432a are, for example, blue charged dyes, and the sixth particles 432b are, for example, the charged dyes of other color, wherein the polarity of the fifth particles 432a is opposite to the polarity of the sixth particles 432b.

Figure 3E:
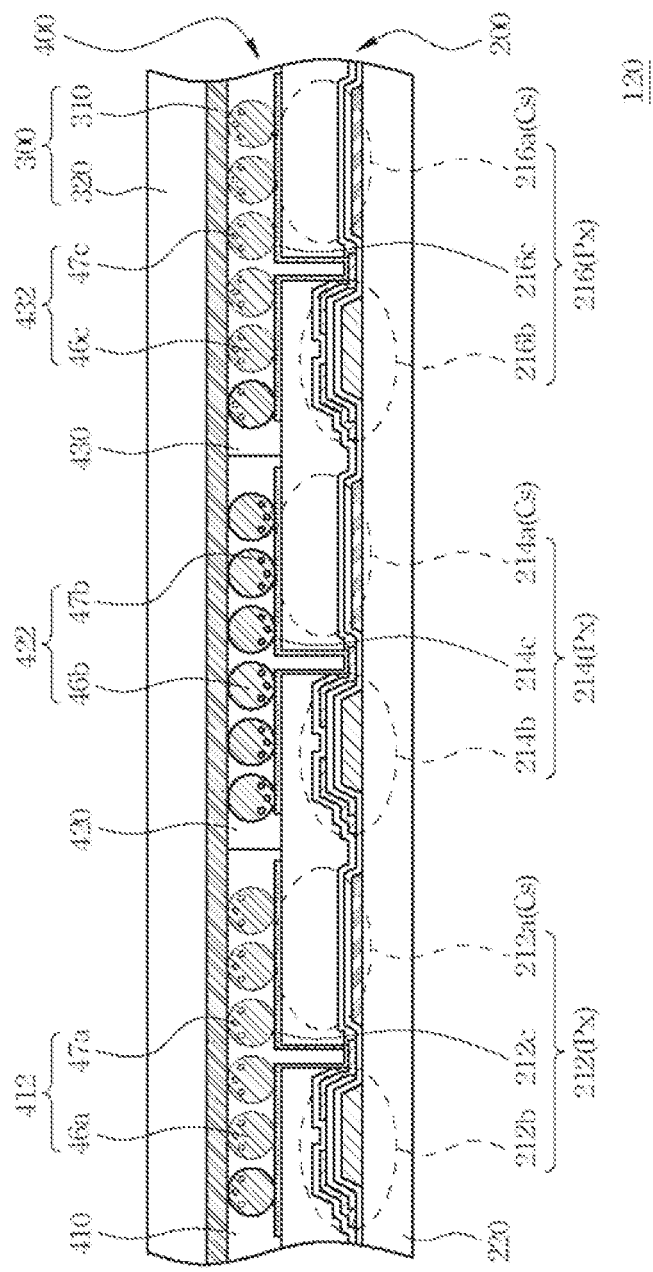
FIG. 3E is a schematic diagram showing the structure diagram of further another electronic-ink display panel 120 in accordance with the first embodiment of present invention.

FIG. 3E is a schematic diagram showing the structure diagram of further electronic-ink display panel 120 in accordance with the first embodiment of present invention. The electronic-ink display panel 120 is similar to the electronic display panel 100, but the difference is in that the electronic-ink display panel 120 comprises microcapsules 412, 422, and 432 comprising charged particles and an opaque liquid. The first ink material pattern 410 comprises a plurality of microcapsules 412, wherein the one microcapsule 412 comprises a plurality of first particles 47a(for example: red charged dyes), and an opaque liquid 46a with different color. One the second ink material pattern 420 comprises a plurality of microcapsules 422, wherein the microcapsules 422 comprise a plurality of second particles 47b(for example: red charged dyes), and opaque liquid 46b with different color. One the third ink material pattern 430 comprises a plurality of microcapsules 432, wherein the microcapsules 432 comprise a plurality of third particles 47c(for example: red charged dyes), and an opaque liquid 46c with different color.

Second Embodiment

Figure 4A:
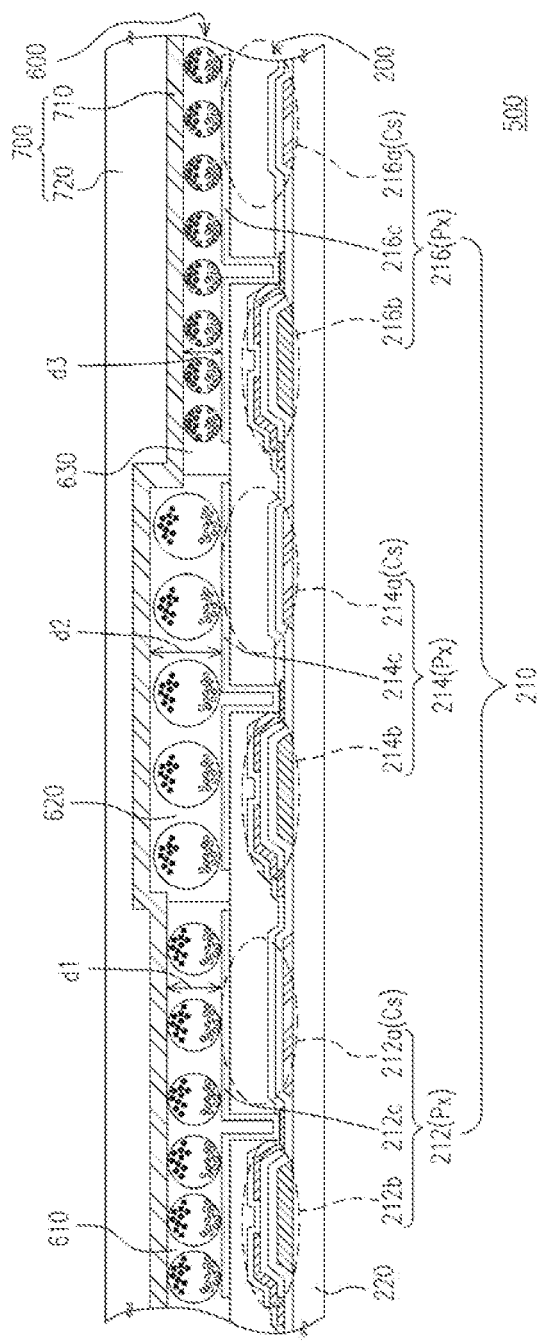
FIG. 4A is a schematic diagram showing the structure diagram of an electronic display panel in accordance with a second embodiment of the present invention.
Figure 4B:
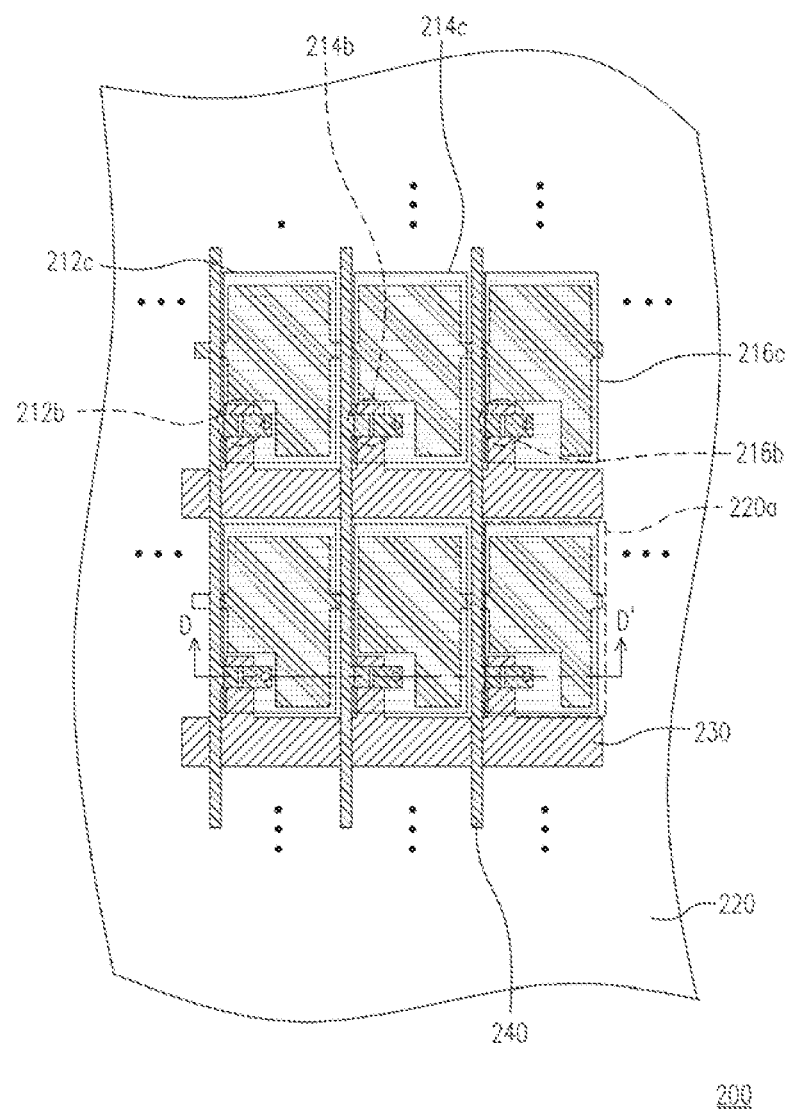
FIG. 4B is a schematic top view showing an active matrix substrate of the electronic-ink display in the FIG. 4A.

FIG. 4A is a schematic diagram showing the structure diagram of an electronic display panel in accordance with a second embodiment of the present invention. FIG. 4B is a schematic top view showing an active matrix substrate of the electronic-ink display in the FIG. 4A, wherein FIG. 4A is a cross-section view showing the TFT array substrate in the electronic-ink display panel along the hatches D-D' illustrated in the FIG. 4B. Referring to the FIG. 4A and FIG. 4B simultaneously. The electronic-ink display panel 500 is similar to the electronic-ink display panel 100, but the difference is in that in the electronic-ink material layer 600, the first ink material pattern 610 has a thickness d1, and the second ink material pattern 620 has a thickness d2, and the third ink material pattern 630 has a thickness d3, wherein the relationship between d1, d2, and d3 is d1≠d2≠d3. It is noted that the first ink material pattern 610, the second ink material pattern 620, and the third ink material pattern 630 comprise charged dye of different color.

Figure 4C:
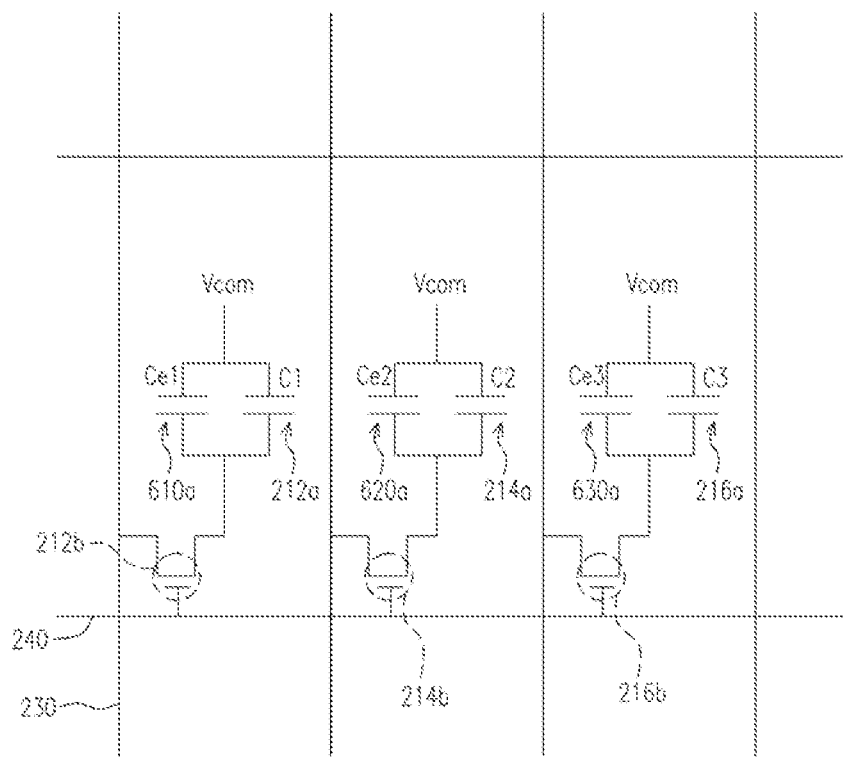
FIG. 4C is a schematic diagram showing a partial equivalent circuit diagram of the electronic-ink display panel in FIG. 4A.

FIG. 4C is a schematic diagram showing a partial equivalent circuit diagram of the electronic-ink display panel in FIG. 4A. Referring to the FIG. 4A and FIG. 4C simultaneously. The present embodiment is similar to the first embodiment. A common electrode 710, one of the first ink material patterns 610, and the first pixel electrode 212c corresponding to the one of the first ink material patterns 610 construct a first display capacitor 610a having capacitance Ce1. The common electrode 710, one of the second ink material patterns 620, and the second pixel electrode 214c corresponding to the one of the second ink material patterns 620 construct a second display capacitor 620a having capacitance Ce2. The common electrode 710, one of the third ink material patterns 630, and the third pixel electrode 216c corresponding to the one of the third ink material patterns 630 construct a third display capacitor 630a having capacitance Ce3.

In present embodiment, changing the area A1, A2, and A3 occupied by the first storage capacitor 212a, the second storage capacitor 214a, and the third storage capacitor 216a can let each of the total capacitances be all the same.

In addition, by changing the thickness d1 of the first ink material pattern 610, the thickness d2 of the second ink material pattern 620, and the thickness d3 of the third ink material pattern 630, the capacitance Ce1 of the first display can be changed so that each of the total capacitances can be all the same from each other. Similarly, if the microcapsules in the first ink material pattern 610, the second ink material pattern 620, and the third ink material pattern 630 comprise charged particles and an opaque liquid with the color different from the color of the charged particles, the aforementioned structure can let each of the total capacitances to be all the same.

Because of the advantages of the electronic-ink display panel 500 are the same as the advantages of the electronic-ink display panel 100 in the first embodiment, it is not necessary to describe the advantages of the electronic-ink display panel 500 here.

Figure 4D:
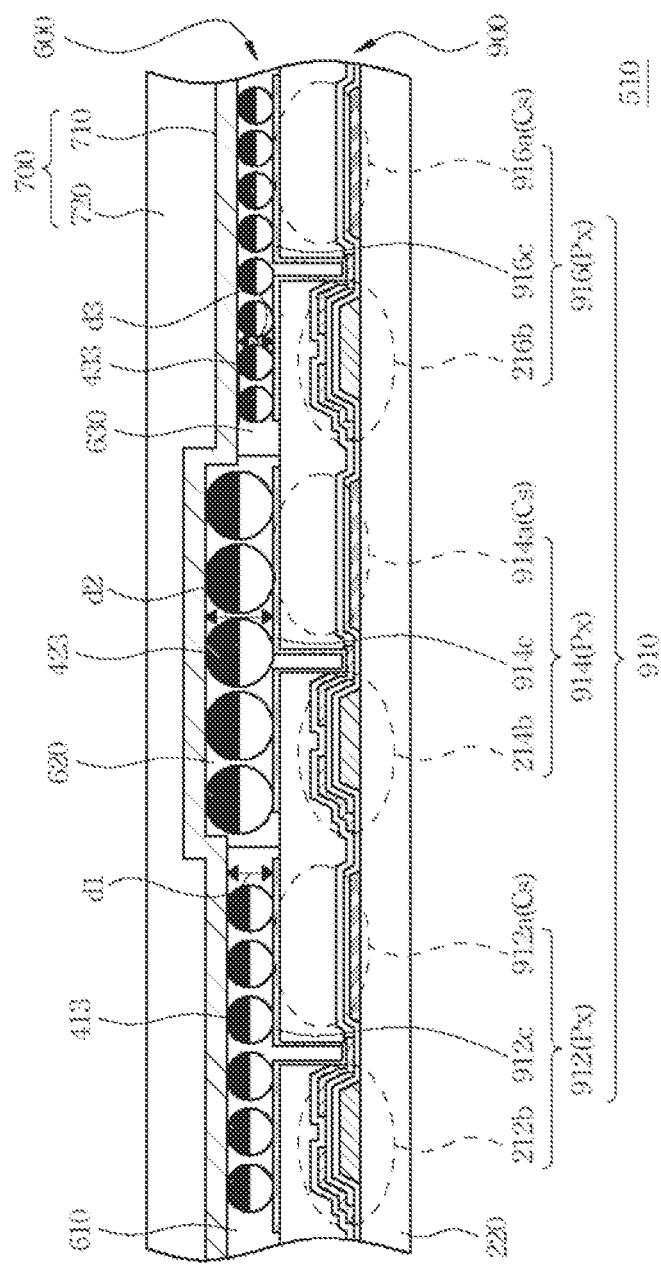
FIG. 4D is a schematic diagram showing the structure of another electric ink display panel in accordance with the second embodiment of the present invention.

FIG. 4D is a schematic diagram showing the structure of another electric ink display panel 510 in accordance with the second embodiment of the present invention. The electronic-ink display panel 510 is similar to the electronic-ink display panel 500, but the difference is in that the electronic-ink display panel 510 comprises bi-color charged particle 413, 423, and 433 instead of the microcapsule 412, 422 and 432 in the electronic-ink display panel 100.

FIG. 4E is a schematic diagram showing the structure diagram of further another electric ink display panel 721 in accordance with the second embodiment of the present invention. The electronic-ink display panel 721 is similar to the electronic-ink display panel 500, but the difference is in that the microcapsule 412 in the electronic-ink display panel 721 comprises an opaque liquid 46a and first charged particles 47a; the microcapsule 422 in the electronic-ink display panel 721 comprises an opaque liquid 46b and second charged particles 47b; the microcapsule 432 in the electronic-ink display panel 721 comprises an opaque liquid 46c and second charged particles 47c.

Third Embodiment

Figure 5B:
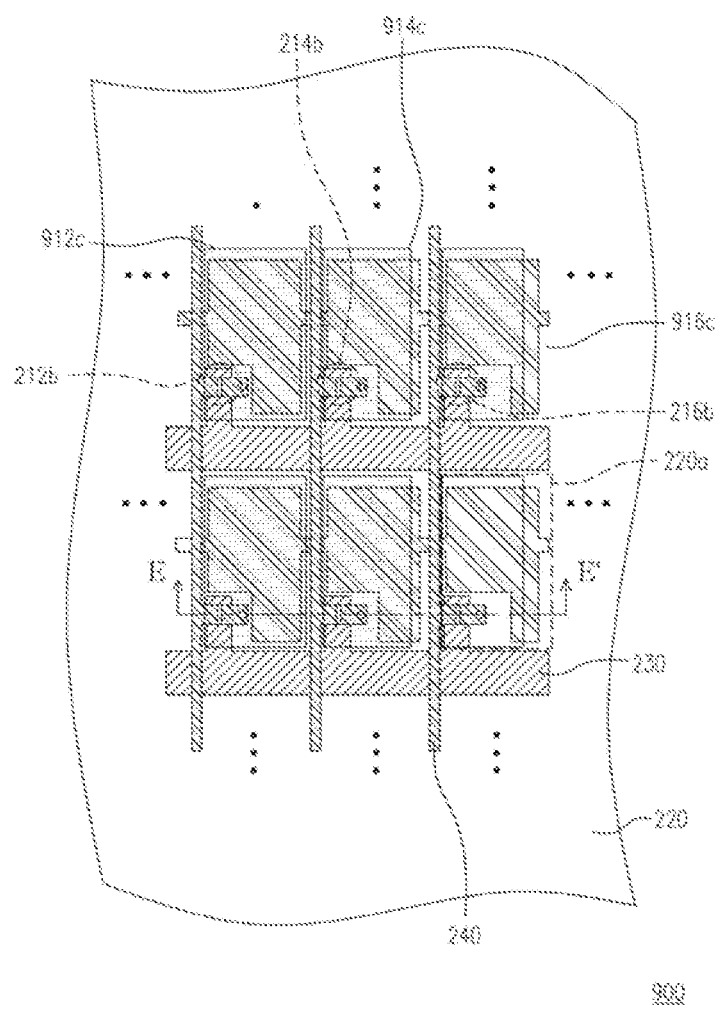
FIG. 5B is a schematic top view showing an active matrix substrate of the electronic-ink display illustrated in the FIG. 5.
Figure 5C:
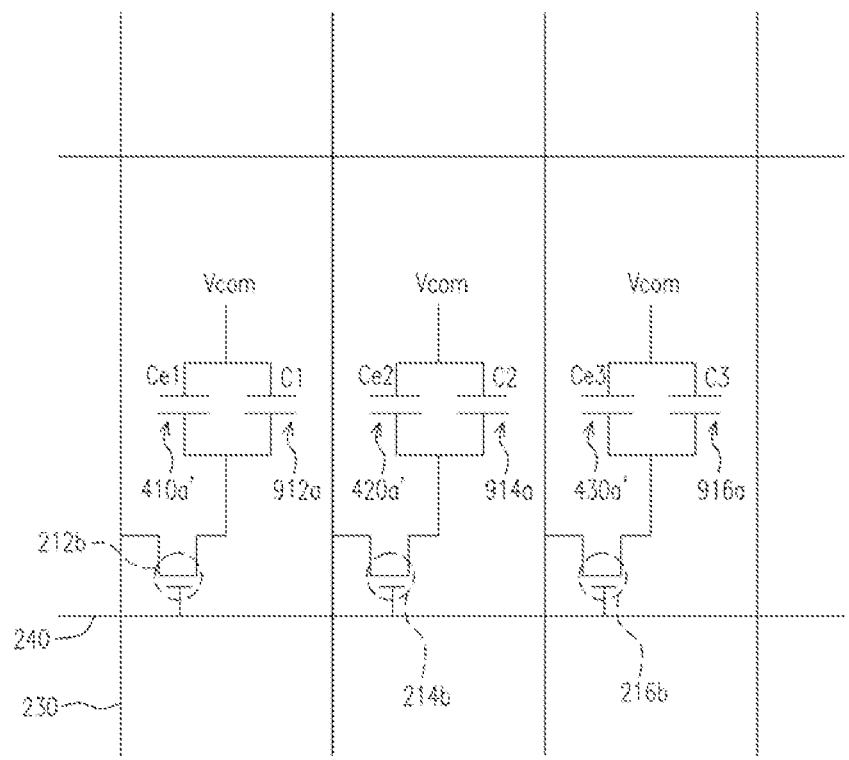
FIG. 5C is a schematic diagram showing a partial equivalent circuit of the electronic-ink display panel illustrated in the FIG. 5A.

FIG. 5A is a schematic diagram showing the structure of an electronic-ink display panel in accordance with a third embodiment of the present invention. FIG. 5B is a schematic top view showing an active matrix substrate of the electronic-ink display illustrated in the FIG. 5A. FIG. 5C is a schematic diagram showing the partial equivalent circuit of the electronic-ink display panel illustrated in the FIG. 5A. FIG. 5A is a schematic diagram showing a cross-section view of the TFT array substrate in the electronic-ink display panel along the hatches E-E' illustrated in the FIG. 5B. Referring to the FIG. 5A through FIG. 5C simultaneously. The electronic-ink display panel 800 is similar to the electronic-ink display panel 100, but the difference is in that the relationships among the overlap area B1 between the common electrode 310 and each of the first pixel electrodes 912c, the overlap area B2 between the common electrode 310 and each of the second pixel electrodes 914c, and the overlap area B3 between the common electrode 310 and each of the third pixel electrodes 916c are B1≠B2, and B2=B3.

In the present invention, changing the area occupied by the first storage capacitor 212a, the second storage capacitor 214a, and the third storage capacitor 216a can achieve the purpose that each of the total capacitances is the same as each other.

Besides the aforementioned method, the capacitance Ce1 of the first display capacitor 410a', the capacitance Ce2 of the second display capacitor 420a', and the capacitance Ce3 of the third display capacitor 430a' can be changed by changing B1, B2, and B3 for making C1+Ce1=C2+Ce2=C3+Ce3. Similarly, if one microcapsule in the electronic-ink layer 400 comprises charged dyes and an opaque liquid of the color different from the color of the charged dye, the foregoing structure can enable the electronic-ink display panel 800 to let each of the total capacitance be all the same.

Because of the advantages of the electronic-ink display panel 800 are the same as the advantages of the electronic-ink display panel 100 in the first embodiment, it is not necessary to describe the advantages of the electronic-ink display panel 500 here.

Figure 5D:
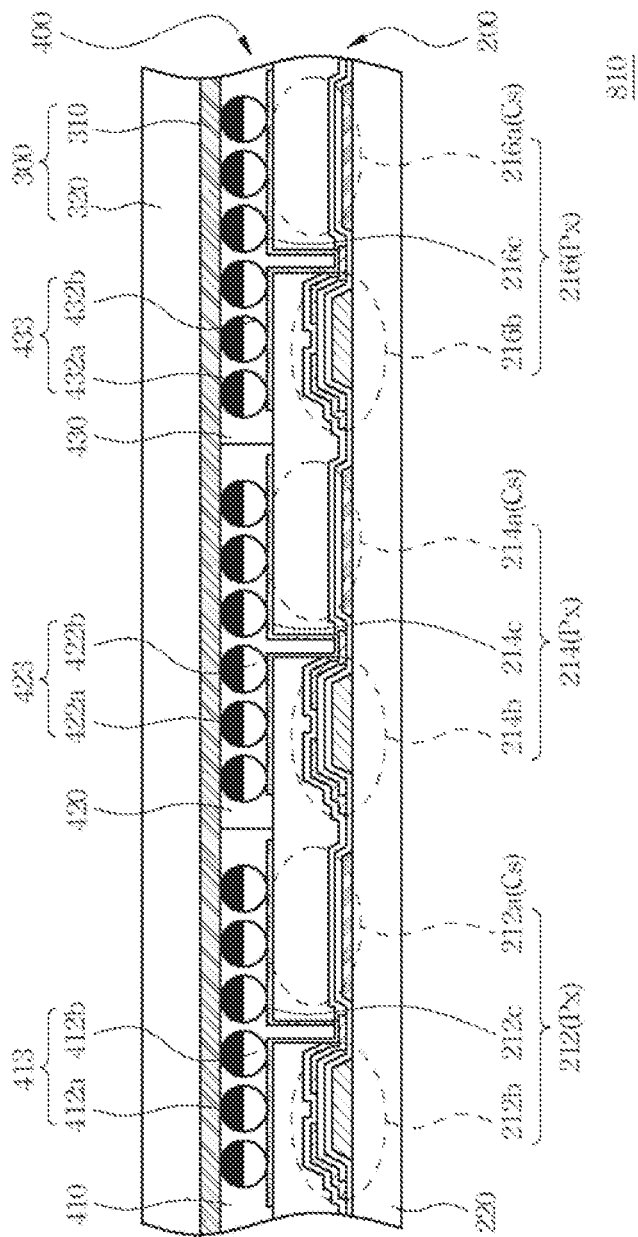
FIG. 5D is a schematic diagram showing the structure diagram of another electric ink display panel in accordance with the third embodiment of the present invention.

FIG. 5D is a schematic diagram showing the structure diagram of another electric ink display panel 810 in accordance with the third embodiment of the present invention. The electronic-ink display panel 810 is similar to the electronic-ink display panel 800, but the difference is in that the electronic-ink display panel 810 comprises bi-color charged particle 413, 423, and 433 instead of the microcapsule 412, 422 and 432 in the electronic-ink display panel 800.

Figure 5E:
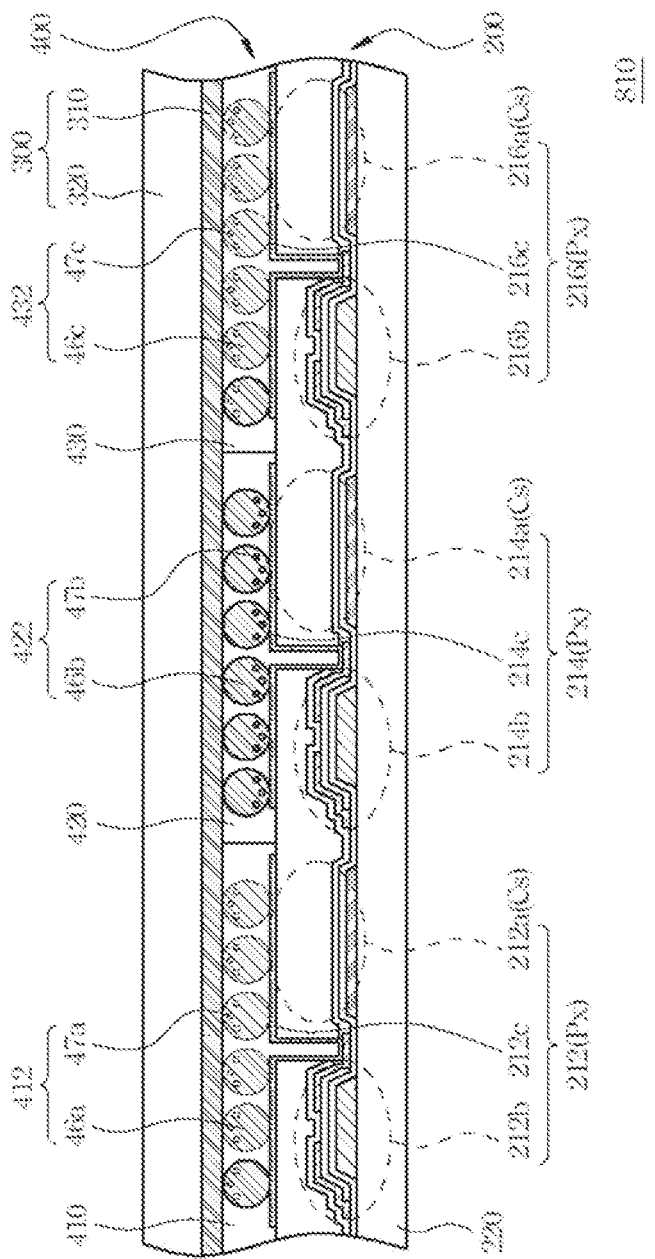
FIG. 5E is a schematic diagram showing a structure of further another electric ink display panel in accordance with the third embodiment of the present invention.

FIG. 5E is a schematic diagram showing a structure of further another electric ink display panel 850 in accordance with a third embodiment of the present invention. The electronic-ink display panel 850 is similar to the electronic-ink display panel 500, but the difference is in that the microcapsule 412 in the electronic-ink display panel 850 comprises an opaque liquid 46a and first charged particles 47a; the microcapsule 422 in the electronic-ink display panel 850 comprises an opaque liquid 46b and second charged particles 47b; the microcapsule 432 in the electronic-ink display panel 850 comprises an opaque liquid 46c and second charged particles 47c.

In accordance with the above-mentioned description, in the electronic-ink display panel provided by the present invention, the capacitance of the storage capacitor compensates the capacitance of the display capacitor constructed by the common electrode, one of the ink material patterns, and the pixel electrode corresponding thereto, to make each of the total capacitances of the storage capacitor and the display storage capacitor to be all the same. The method provided by the present invention comprises changing the area occupied by the storage capacitors, the thickness of the ink material patterns, and the overlap area between the common electrode and the pixel electrode corresponding thereto.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An electronic-ink display panel, comprising:
an active matrix substrate having a plurality of pixel units, wherein each of the pixel units comprises a plurality of sub-pixel units, and each of the sub-pixel units has a storage capacitor and a capacitor formed from an ink material pattern positioned out of the storage capacitor, and in one pixel unit, the capacitance of the storage capacitor of at least one of the sub-pixel units is different from those of the storage capacitors of the other sub-pixel units, and the ink material patterns corresponding to the sub-pixel units respectively comprise charged dyes of different colors to make the capacitances of the capacitors formed from the ink material patterns different, and the total capacitance of the storage capacitor and the capacitor is the same for each of the sub-pixels, and the sub-pixel-units of any of each of the pixels correspond to red, blue, and green, respectively;
a front plane laminate disposed over the active matrix substrate; and
an electronic-ink layer disposed between the active matrix substrate and the front plane laminate and comprising the ink material patterns.

2. The electronic-ink display panel of claim 1, wherein the active matrix substrate further comprises:
a substrate;
a plurality of scan lines disposed on the substrate; and
a plurality of data lines disposed on the substrate, wherein the data lines and the scan lines define a plurality of pixel areas on the substrate.

3. The electronic-ink display panel of claim 2, wherein each of the pixel units comprises:
a first sub-pixel unit having a first storage capacitor;
a second sub-pixel unit having a second storage capacitor; and
a third sub-pixel unit having a third storage capacitor, wherein in each of the pixel units, the first sub-pixel unit, the second sub-pixel unit, and the third sub-pixel unit are electrically connected to the same scan line and are separately located in three pixel areas every two of which are adjacent to each other.

4. The electronic-ink display panel of claim 3, wherein the front plane laminate comprises:
a common electrode disposed on the electronic-ink layer; and
a protection film disposed on the common electrode.

5. The electronic-ink display panel of claim 3, wherein each of the first sub-pixel units has a first active element and a first pixel electrode electrically connected to the first active element; and each of the second sub-pixel units has a second active element and a second pixel electrode electrically connected to the second active element; and each of the third sub-pixel units has a third active element and a third pixel electrode electrically connected to the third active element.

6. The electronic-ink display panel of claim 5, wherein the electronic-ink layer comprises:
a plurality of first ink material patterns disposed on the first pixel electrodes;
a plurality of second ink material patterns disposed on the second pixel electrodes; and
a plurality of third ink material patterns disposed on the third pixel electrodes.

7. The electronic-ink display panel of claim 6, wherein the relationships among the capacitance (C1) of the first storage capacitor, the capacitance (C2) of the second storage capacitor and the capacitance (C3) of the third storage capacitor are $C1 \neq C2 \neq C3$.

8. The electronic-ink display panel of claim 7, wherein the common electrode, one of the first ink material patterns, and the first pixel electrode corresponding thereto construct a first capacitor, and the common electrode, one of the second ink material patterns, and the second pixel electrode corresponding thereto construct a second capacitor, and the common electrode, one of the third ink material patterns, and the third pixel electrode corresponding thereto construct a third capacitor, wherein the relationships among the capacitance (Ce1) of the first capacitor, the capacitance (Ce2) of the storage capacitor and the capacitance (Ce3) of the third capacitor are $Ce1 \neq Ce2 \neq Ce3$, and $C1+Ce1=C2+Ce2=C3+Ce3$.

9. The electronic-ink display panel of claim 8, wherein the relationships among the area (A1) occupied by the first storage capacitor, the area (A2) occupied by the second storage capacitor, and the area (A3) occupied by the third storage capacitor are $A1 \neq A2 \neq A3$.

10. The electronic-ink display panel of claim 9, wherein the relationships among the thickness (d1) of each of the first ink material patterns, the thickness (d2) of each of the second ink material patterns, and the thickness (d3) of each of the third ink material patterns are $d1 \neq d2 \neq d3$.

11. The electronic-ink display panel of claim 9, wherein the material of the first ink material patterns, the material of the second material patterns, and the material of the third material patterns are different.

12. The electronic-ink display panel of claim 9, wherein the relationships among the overlap area (B1) between the common electrode and each of the first pixel electrodes, the overlap area (B2) between the common electrode and each of the second pixel electrodes, and the overlap area (B3) between the common electrode and each of the third pixel electrodes are $B1 \neq B2 \neq B3$.

13. An electronic-ink display panel, comprising:
an active matrix substrate having a plurality of pixel units, wherein each of the pixel units comprises a plurality of sub-pixel units, and each of the sub-pixel units has a storage capacitor and a capacitor, and in one pixel unit, the capacitance of the storage capacitor of at least one of the sub-pixel units is different from those of the storage capacitors of the other sub-pixel units, and the total capacitance of the storage capacitor and the capacitor is the same for each of the sub-pixels, and the matrix substrate further comprises:
a substrate;
a plurality of scan lines disposed on the substrate; and
a plurality of data lines disposed on the substrate, wherein the data lines and the scan lines define a plurality of pixel areas on the substrate;
wherein each of the pixel units comprises:
a first sub-pixel unit having a first storage capacitor;
a second sub-pixel unit having a second storage capacitor; and
a third sub-pixel unit having a third storage capacitor, wherein in each of the pixel units, the first sub-pixel unit, the second sub-pixel unit, and the third sub-pixel unit are electrically connected to the same scan line and are separately located in three pixel areas every two of which are adjacent to each other;
wherein each of the first sub-pixel units has a first active element and a first pixel electrode electrically connected to the first active element; and each of the second sub-pixel units has a second active element and a second pixel electrode electrically connected to the second active element; and each of the third sub-pixel units has a third active element and a third pixel electrode electrically connected to the third active element;
a front plane laminate disposed over the active matrix substrate; and
an electronic-ink layer disposed between the active matrix substrate and the front plane laminate, wherein the electronic-ink layer comprises:
a plurality of first ink material patterns disposed on the first pixel electrodes and positioned out of the storage capacitors;
a plurality of second ink material patterns disposed on the second pixel electrodes and positioned out of the storage capacitors; and
a plurality of third ink material patterns disposed on the third pixel electrodes and positioned out of the storage capacitors;
wherein the first ink material patterns, the second ink material patterns and the third ink material patterns respectively comprise charged dyes of different colors to make the capacitances of the capacitors of the sub-pixel units of each of the pixel units different, wherein the relationships among the thickness (d1) of each of the first ink material patterns, the thickness (d2) of each of the second ink material patterns, and the thickness (d3) of each of the third ink material patterns are $d1 \neq d2 \neq d3$.

14. The electronic-ink display panel of claim 13, wherein the relationships among the capacitance (C1) of the first storage capacitor, the capacitance (C2) of the second storage capacitor and the capacitance (C3) of the third storage capacitor are $C1 \neq C2 \neq C3$.

* * * * *